(12) United States Patent
Baud et al.

(10) Patent No.: US 8,830,115 B2
(45) Date of Patent: Sep. 9, 2014

(54) MULTIPLE-SENSOR TRACKING PROCESSING METHOD WITH REDUCED LATENCY TIME

(75) Inventors: Olivier Baud, Issy les Moulineaux (FR); Nicolas Honore, Paris (FR)

(73) Assignee: Thales, Neuilly sur Seine (FR)

( * ) Notice: Subject to any disclaimer, the term of this patent is extended or adjusted under 35 U.S.C. 154(b) by 378 days.

(21) Appl. No.: 12/638,055

(22) Filed: Dec. 15, 2009

(65) Prior Publication Data

US 2010/0156698 A1 Jun. 24, 2010

(30) Foreign Application Priority Data

Dec. 16, 2008 (FR) ...................................... 08 07061

(51) Int. Cl.
*G01S 13/91* (2006.01)
*G01S 13/72* (2006.01)
(52) U.S. Cl.
CPC ...... *G01S 13/72* (2013.01); *G01S 13/91* (2013.01)
USPC .................. 342/59; 342/36; 342/96
(58) Field of Classification Search
USPC ........................................................... 342/59
See application file for complete search history.

(56) References Cited

U.S. PATENT DOCUMENTS

| | | | | |
|---|---|---|---|---|
| 4,899,161 | A * | 2/1990 | Morin et al. | 342/451 |
| 5,128,684 | A * | 7/1992 | Brown | 342/189 |
| 5,138,321 | A * | 8/1992 | Hammer | 342/36 |
| 6,225,942 | B1 * | 5/2001 | Alon | 342/59 |
| 6,359,586 | B1 * | 3/2002 | Sviestins | 342/451 |
| 6,377,204 | B1 * | 4/2002 | Wurman et al. | 342/59 |
| 6,573,858 | B1 | 6/2003 | Fung et al. | |
| 6,803,997 | B2 * | 10/2004 | Stanek | 356/2 |
| 6,922,493 | B2 * | 7/2005 | Stanek | 382/293 |
| 7,653,513 | B2 * | 1/2010 | Resende et al. | 702/189 |
| 8,089,393 | B2 * | 1/2012 | Nettleton et al. | 342/59 |

FOREIGN PATENT DOCUMENTS

EP 0 926 511 A2 6/1999

OTHER PUBLICATIONS

Blackman et al., "A Maximum Likelihood Expression for Data Association", Jan. 1, 1986, Chapter 9, Dedham, Artech House Inc., XP002277516.
S. S. Blackman, "Multiple-Target Tracking with Radar Applications", Jan. 1, 1986, Chapters 3 and 13, Dedham Artech House Inc., XP002541259.
Blackman et al., "Multiple-Target Tracking with Radar Applications", Jan. 1, 1986, Chapter 10, Dedham, Artech House Inc., XP002277516.

* cited by examiner

*Primary Examiner* — Matthew M Barker
(74) *Attorney, Agent, or Firm* — Baker & Hostetler LLP

(57) ABSTRACT

A multiple-sensor tracking method, notably implemented in an air traffic control system, making it possible to reduce the latency time introduced by the tracking system, characterized in that the correlation (302) and association (303) functions work on the basis of membership of the detections (502) and of the tracks (503, 504) to cells (510, 511) defining a subdivision into a grid (501) of the surveillance area represented on a stereographic projection plane.

6 Claims, 5 Drawing Sheets

MULTIPLE-SENSOR TRACKING PROCESSING METHOD WITH REDUCED LATENCY TIME

CROSS-REFERENCE TO RELATED APPLICATIONS

This application claims priority of foreign French patent application no. FR 0807061, filed Dec. 16, 2008, the disclosure of which is hereby incorporated by reference in its entirety.

BACKGROUND OF THE INVENTION

1. Field of the Invention

The present invention relates to a multiple-sensor tracking processing method with reduced latency time. It notably concerns the aircraft radio tracking systems implemented in air traffic management.

2. Discussion on the Background

Air traffic control, or ATC, enables air traffic controllers to ensure the safe, rapid and effective execution of aircraft flights in the air space under surveillance. Its role is mainly to prevent collisions between the aircraft and the ground or vehicles, and in-flight collisions between aircraft. It also consists in speeding up and ordering air traffic, in providing the aircraft with advice and information useful to the safe and effective execution of the flight, such as weather information, information on the status of ground navigation means, traffic information. It finally consists in providing an alert service to warn the appropriate organizations when aircraft need help from emergency and rescue organizations, and to lend these organizations the necessary support.

The data needed to manage air traffic control originate mainly from a plurality of sensors. Among these sensors, primary surveillance radars, or PSR, provide echoes from targets, via azimuth, distance and detection instant information.

Data are also supplied by secondary surveillance radars, or SSR; an SSR sends signals to targets. When these targets are aircraft equipped with transponders, the latter send in return information that is received by the SSR. The information received by the SSR comprises the distance and the azimuth, as well as complementary information supplied by the transponder depending on its type. Thus, a transponder that is compatible with the NC mode supplies an aircraft identification datum (mode A) and a barometric altitude datum (mode C). The set of data supplied by an SSR therefore allows for an identification of the aircraft moving within its field of vision, and the determination of their respective positions in a three-dimensional frame of reference. There are also transponders equipped with a refined mode, or mode S, that supplies, on request, the same data as the NC mode, plus a unique identification of the aircraft coded on 24 bits, and bilateral means of communicating miscellaneous data.

Other aircraft location data and objects on the ground are supplied by multilateration sensors, or MLAT, consisting of a plurality of omnidirectional antennas scattered on the ground, receiving signals sent by an aircraft in order to locate it. These signals can be unsolicited or else sent by the aircraft in response to signals originating from radars. Calculations relating to the differences between the reception times of these signals by at least two antennas make it possible to determine the position of the aircraft. This type of sensor is widely used for monitoring movements on the ground in airport areas and in approach areas. Another technique that works in a similar manner is used to locate aircraft outside airport approach zones, based on the signals received by a plurality of omnidirectional antennas arranged over much wider geographical areas; this technique is named WAM, which stands for Wide Area Multilateration.

There are also surveillance systems that are automatic and dependent on the aircraft, known by the acronyms ADS standing for Automatic Dependent Surveillance. A first ADS system, called ADS-C standing for Automatic Dependent Surveillance-Contract, is used mainly for areas in which few sensors of other types are available, for example desert or ocean areas. The aircraft that are equipped therewith broadcast by radio to a communication satellite data relating to their position, for example determined by an on-board computer on the basis of data supplied by a satellite geolocation receiver or GPS standing for Global Positioning System, and/or by an inertial unit. Other data are broadcast, such as data concerning the route planned for the aircraft, the speeds of the aircraft relative to the air and the ground, weather data (wind strength and direction, temperature, etc.). The broadcasting of these data by the aircraft can be done periodically or in response to certain events, or even in emergency situations. The data are then transmitted by the satellite and are received by a dedicated antenna.

A second ADS system is named ADS-B standing for Automatic Dependent Surveillance-Broadcast. The aircraft that are equipped therewith broadcast by radio the data described previously with reference to ADS-C, directly to a ground antenna. The transmission is done periodically, at a much higher frequency, of at least one transmission per second.

Multiple-sensor tracking, or multiple-sensor radio tracking, is the process which, based on a plurality of detections transmitted by different sensors out of the abovementioned sensors, makes it possible to:
  recognize, from the detections available to it, the ones that sample the trajectory of each aircraft present in the detection coverage of each sensor,
  reconstruct as accurately as possible the trajectories of the aircraft, that is to say the multiple-radar tracks.

The expression "multiple-radar tracking", or "multiple-radar radio tracking", is used when the sensors are radars, notably of PSR or SSR type.

Multiple-radar tracking is generally based on a technique of merging radar detections, or MPVU which stands for Multiple Plot-Variable Update. With this technique, each point, or "plot", deriving from the detection of one and the same aircraft is processed as rapidly as possible, in order to update the corresponding multiple-radar track as quickly as possible. There are other known methods of multiple-radar tracking, but among them, MPVU is the one that gives the greatest accuracy. Nevertheless, this accuracy presupposes a relative complexity of the calculations made by the radio-tracking system. A complexity of the calculations leads to a strong latency introduced by the radio tracking system, this latency being able to be defined as the time difference calculated between the moment of output of the information from the radio tracking system, and the moment of reception of the input data.

TIS-B, standing for Traffic Information Service-Broadcast, is a service making it possible to broadcast traffic information to airborne systems, and notably to aircraft pilots. The broadcasting of information is handled by stations on the ground transmitting surveillance information from the ground to the air. TIS-B does not require any transmission of information or acknowledgements of reception of TIS-B messages by the aircraft. On the other hand, for the system to be effective, it is essential for the latency time of the entire information transmission subsystem to be low. The latency time of the entire transmission subsystem comprises the time to be counted from the reception of the information by the various radars and sensors, via the processing of the information by the radars and sensors, the transmission of the information to the air traffic control centre, the processing of the input data at the air traffic control centre, the processing of the data proper by the multiple-sensor radio tracking system, or MSTS standing for Multi-Sensor Tracking System, then the processing of the output data, their broadcasting, and even the reception by the aircraft moving in the space of interest. The maximum acceptable total latency time is defined, for example, in the United States by the standard: DO-286B-TIS-B MASPS (Traffic Information Service-Broadcast-Minimum Aviation System Performance Specifications).

The latency time introduced by a multiple-radar radio tracking system working on the basis of the current techniques is such that, on its own, it contributes in a prohibitive way to the overall latency time of the entire transmission subsystem, making conformity to the abovementioned standard DO-286B-TIS-B MASPS impossible.

Furthermore, the latency times associated with the transmission line from a radar to the ATC centre can be highly variable for a given line, and thus require the tracking systems to use additional buffer memory segments, which extends the latency time introduced by the tracking system; this drawback is known by the name "time disorders".

Another drawback in the processing of information originating from radars, that has a negative impact on the latency time introduced by the tracking system, is linked to the fact that it is necessary for the system to wait for specific signals from the radars, indicating that all the plots of a given segment have been sent, before beginning the processing on the plots of this segment.

SUMMARY OF THE INVENTION

One aim of the present invention is to overcome the abovementioned drawbacks, by proposing a method of reducing the latency time introduced by the multiple-sensor radar tracking system in the context of air traffic control making it possible for multiple-sensor radio tracking systems of MPVU type to conform to the abovementioned standard, with respect to the maximum acceptable latency time in a TIS-B-type system.

Furthermore, another advantage obtained by the present invention overcomes a drawback linked to the processing of information originating from radars, such as targets moving notably at high ground speeds, in the vicinity of the centre of a radar, that cannot be perceived, or else cannot be associated with tracks; this drawback is linked to the subdivision of the surveillance area into cells of angular segments, the surface area of which is smaller in proximity to the centre of the radar.

To this end, the subject of the invention is a multiple-sensor tracking processing method of processing the tracking of air targets moving in a space of interest by a plurality of sensors, characterized in that:

the detections originating from the sensors are synthesized in the form of detections of a single dummy radar synchronized by a plurality of internal virtual time segments of determined duration, the method comprises a preliminary step establishing a two-dimensional grid of a stereographic projection plane of the space of interest, the two-dimensional grid being divided into a plurality of cells of rectangular shape, the radio tracking system stores, in a buffer memory, all the detections produced during at least one internal virtual segment, a correlation function applies a correlation of the detections with the tracks on the basis of a first proximity criterion between the cells of the two-dimensional grid containing the detections and the tracks.

In one embodiment of the invention, the multiple-sensor tracking processing method described above can be characterized in that the correlation function is triggered by a message indicating the end of the internal virtual segment, the correlation being made on the basis of the detections stored during the internal virtual segment.

In one embodiment of the invention, the multiple-sensor tracking processing method described above can be characterized in that it also comprises an association function associating the detections with tracks on the basis of an additional criterion of time difference between the instant of reception of a radar detection and the instant of reception of the message indicating the end of an internal virtual segment having triggered the correlation and association processing operations, the criterion allowing for a confirmation of the association of the detection with the track, an update of the track and the deletion of the detection from the buffer memory, if said time difference is greater than a determined threshold, the criterion making it possible to retain the detection in the buffer memory for a subsequent processing operation if the time difference is less than the determined threshold.

In one embodiment of the invention, the multiple-sensor tracking processing method described above can be characterized in that the cells of rectangular shape have a square shape with the side having a predetermined length.

In one embodiment of the invention, the multiple-sensor tracking processing method described above can be characterized in that the first proximity criterion makes it possible to elect candidate tracks for the correlation with a given point corresponding to a detection, all the tracks situated in the 8 cells adjacent to the cell containing the given point, and in said cell.

In one embodiment of the invention, the multiple-sensor tracking processing method described above can be characterized in that the first proximity criterion makes it possible to elect candidate tracks for the correlation with a given point corresponding to a detection, all the tracks situated in the 3 cells adjacent to one of the 4 identical subdivisions of the cell containing the given point, and in said cell.

Another subject of the invention is an air traffic control system, characterized in that it implements a multiple-sensor tracking processing method as described above.

BRIEF DESCRIPTION OF THE DRAWINGS

Other characteristics and advantages of the invention will become apparent from reading the description, given by way of example, and in light of the appended drawings that represent.

DESCRIPTION OF THE PREFERRED EMBODIMENTS

Figure 1:
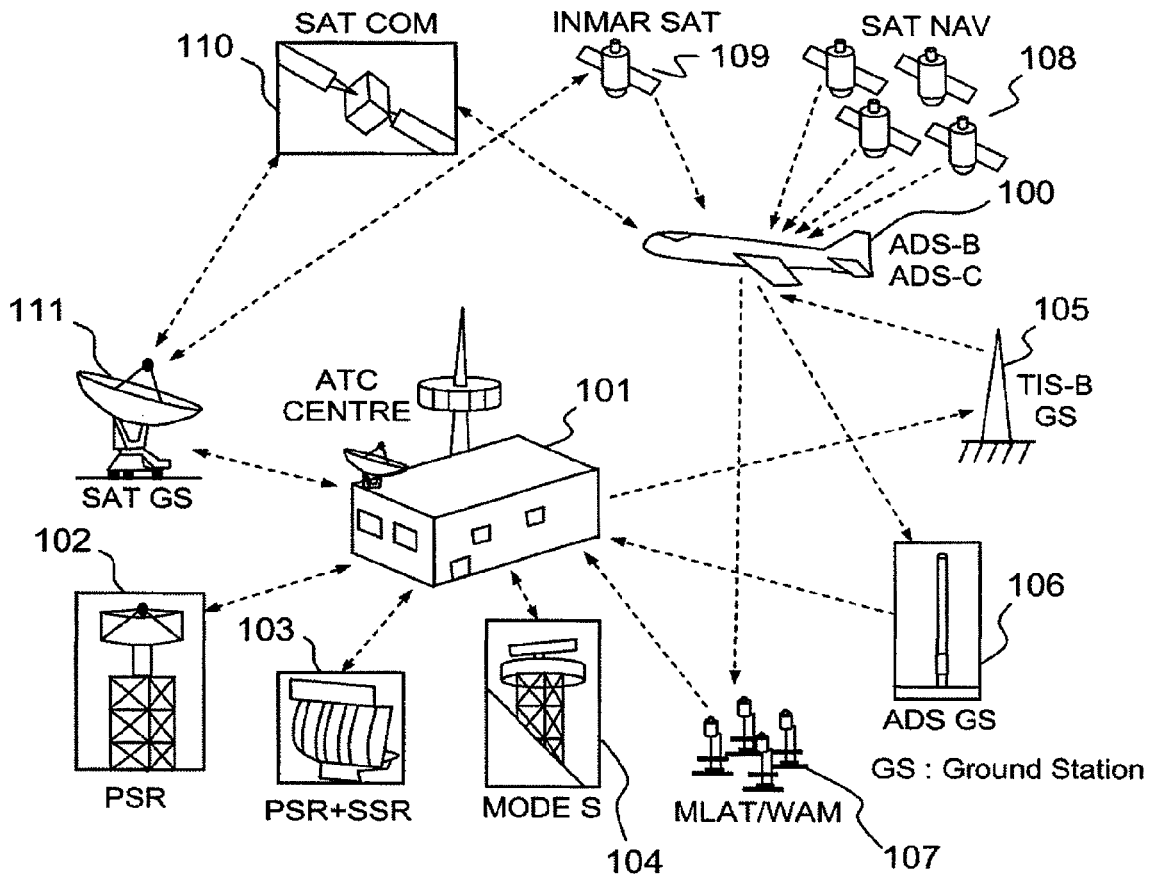
FIG. 1, by a block diagram, the overall structure of an air traffic control system.

FIG. 1 represents, by a block diagram, the overall structure of an air traffic control system. An aircraft 100 transmits and receives information from and to a plurality of transmitters and sensors. Most of the information is centralized and processed in an air traffic control centre ATC 101. In the example of the figure, a primary surveillance radar PSR 102 processes and transmits data to the ATC centre 101. A secondary surveillance radar 103, in this example mounted with a primary surveillance radar, processes and transmits data to the ATC centre 101. An S mode radar 104 transmits data to the ATC centre 101. The aircraft 100 transmits specific signals picked up by a receiving station 106 of ADS type situated on the ground, which itself processes the received information and in turn sends information to the ATC centre 101. The aircraft 100 transmits specific signals picked up by sensors scattered on the ground, of MLAT and/or WAM type 107, that process the received information and in turn send information to the ATC centre 101. A plurality of geopositioning satellites 108 of GPS or Galileo type transmit signals that are picked up by a dedicated receiver of the aircraft 100. The aircraft 100 exchanges information with a Sat Com satellite 110, notably the aircraft 100 sends reports of ADS-C type to the Sat Com satellite 110. The Sat Com satellite 110 itself exchanges information with the ground, via a satellite transmission/reception station 111 on the ground, itself communicating with the ATC centre 101. A satellite 109 communicates with the ground miscellaneous information via the transmission/reception station 111 and transmits information to the aircraft 100.

A ground transmission station of TIS-B type 105 transmits information received by the aircraft 100. The data transmitted by the station 105 are based on data supplied by the ATC centre 101, and are a synthesis of all the data received by the ATC centre 101.

Figure 2:
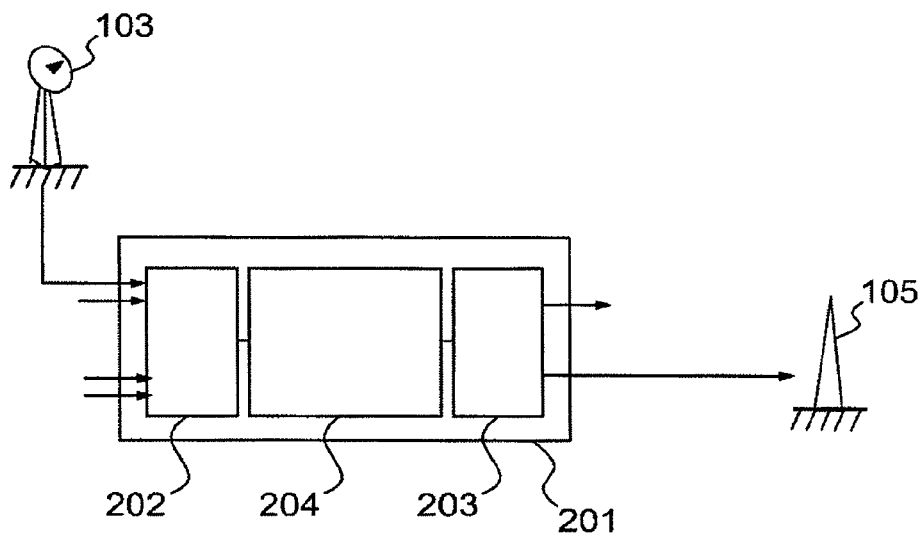
FIG. 2, by a block diagram, the overall structure of a radio tracking system of MPVU type.

FIG. 2 presents, by a block diagram, the overall structure of a radio tracking system of MPVU type 201 known from the state of the art. The radio tracking system is implemented in a computation unit within the air traffic control centre 101. The radio tracking system comprises a device for managing input data 202, a kernel 204, and a device for managing output data 203. The device for managing input data 202 receives the data from all the radars and sensors involved in air traffic management, notably including the SSR radar 103, but also from the primary radars 102, from the data originating from MLAT and WAM beacons 107, from ADS-B reports, etc.

The kernel 204 performs all the processing operations on the input data preprocessed by the device for managing input data 202, and generates output data formatted by the device for managing output data 203. The operation of the kernel is described in more detail hereinbelow with reference to FIG. 3a. The data obtained from the device for managing output data 203 are, for example, sent to a display interface intended for the air traffic controllers, but also to the TIS-B-type transmission station 105.

A first significant latency time can be attributed to the transmission of the data upstream of the device for managing input data 202. This first latency time is inherent in the radars and sensors used, in the processing operations that the latter may perform on the signals that they receive, and to the transmission of their output data to the ATC centre 101. This first latency time is generally greater when it comes to the primary and secondary surveillance radars. Typically, this first latency time can be of the order of 2 seconds. This first latency time is unfortunately difficult to compress, without compromising the structure of the radars and of the transmission lines. Now, the time required by the abovementioned standard DO-286B-TIS-B MASPS and necessary to the effectiveness of the TIS-B system, with regard to the total latency time comprising the first latency time upstream of the device for managing input data 202, the latency time introduced by the processing at the level of the kernel 204, the latency time introduced by the device for managing output data 203, the transmission of the data to the TIS-B transmission station 105 and the formatting of these data before transmission by the latter, is of the order of 3.25 seconds. Thus, it is necessary, for conformity with the abovementioned standard with regard to acceptable latency times in a TIS-B system, for the latency time introduced by the processing at the level of the kernel 204 to be very short, typically less than 850 milliseconds. However, the latency times introduced by the current kernels, for simple processing of data originating from radars of PSR and SSR types, is of the order of a second, in the best cases, and can sometimes take several seconds depending on the types of radars and the infrastructure of the transmission lines. The reasons why the latency times introduced by the current kernels are so great will be better understood from reading the description given with reference to FIGS. 3a and 3b hereinbelow.

Figure 3A:
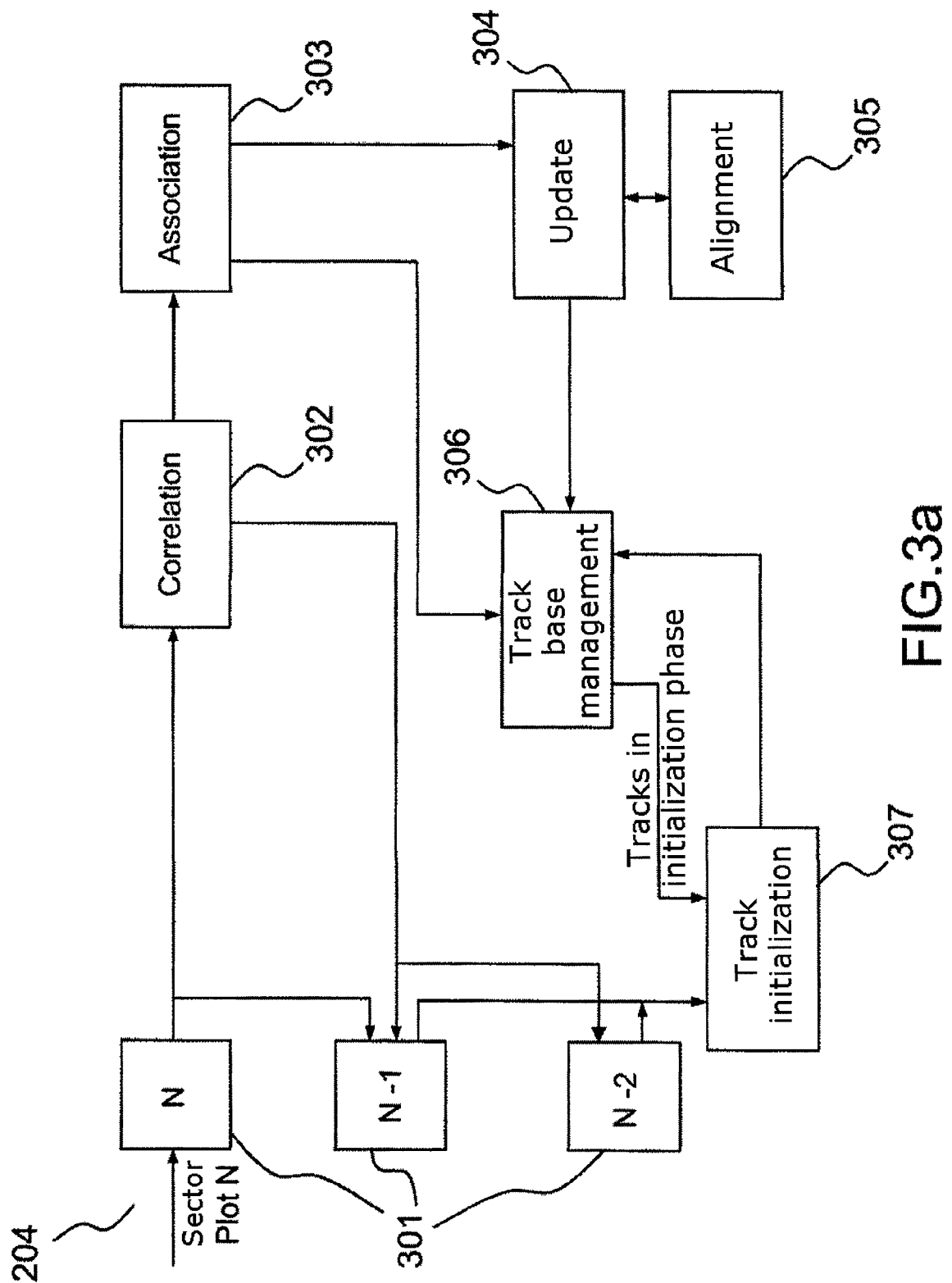
FIG. 3a, by a diagram, the structure of the kernel of a multiple-radar radio tracking system in a radio tracking system of MPVU type.

FIG. 3a presents, via a diagram, the structure of the kernel of a multiple-radar radio tracking system in a radio tracking system of MPVU type, known from the state of the art. The diagram shows 3 angular radar detection segments, or plot segments 301. A block 302 represents a correlation function. A block 303 represents an association function. A block 304 represents an update function. A block 305 represents an alignment function. A block 306 represents a track base management function. A block 307 represents a track initialization function.

The object of the correlation function, represented by the block 302, is to:
  select the maintained multiple-radar tracks that can physically be updated with one of the plots belonging to the plot N segment 301 of the radar 103 received last,
  create all the possible plot-track pairings, each pairing corresponding to the assumed update of the track with the correlated plot.

The object of the association function, represented by the block 303, is to resolve, based on the results supplied by the correlation function 302, potential conflicts, for example such as the assignment of a single plot to several tracks.

The object of the update function, represented by the block 304, is to update the kinematic characteristics of the tracks being processed, based on the results supplied by the association function 303.

The results of the update function 304 and of the association function 303 allow for an update of the track base, via the track base management function represented by the block 306.

The object of the alignment function, represented by the block 305, is to correct the systematic errors, or bias errors, committed by the radars when they perform the detection of a target. To this end, an alignment algorithm performs an estimation, for each of the radars producing plots updating selected tracks, measurement biases in azimuth and in distance. This estimation can then be used for a correction of the measurements obtained from these radars.

The object of the initialization function, represented by the block 307, is to create new tracks when a new aircraft not hitherto represented by a track, appears in the area of interest of the air traffic control system.

Figure 3B:
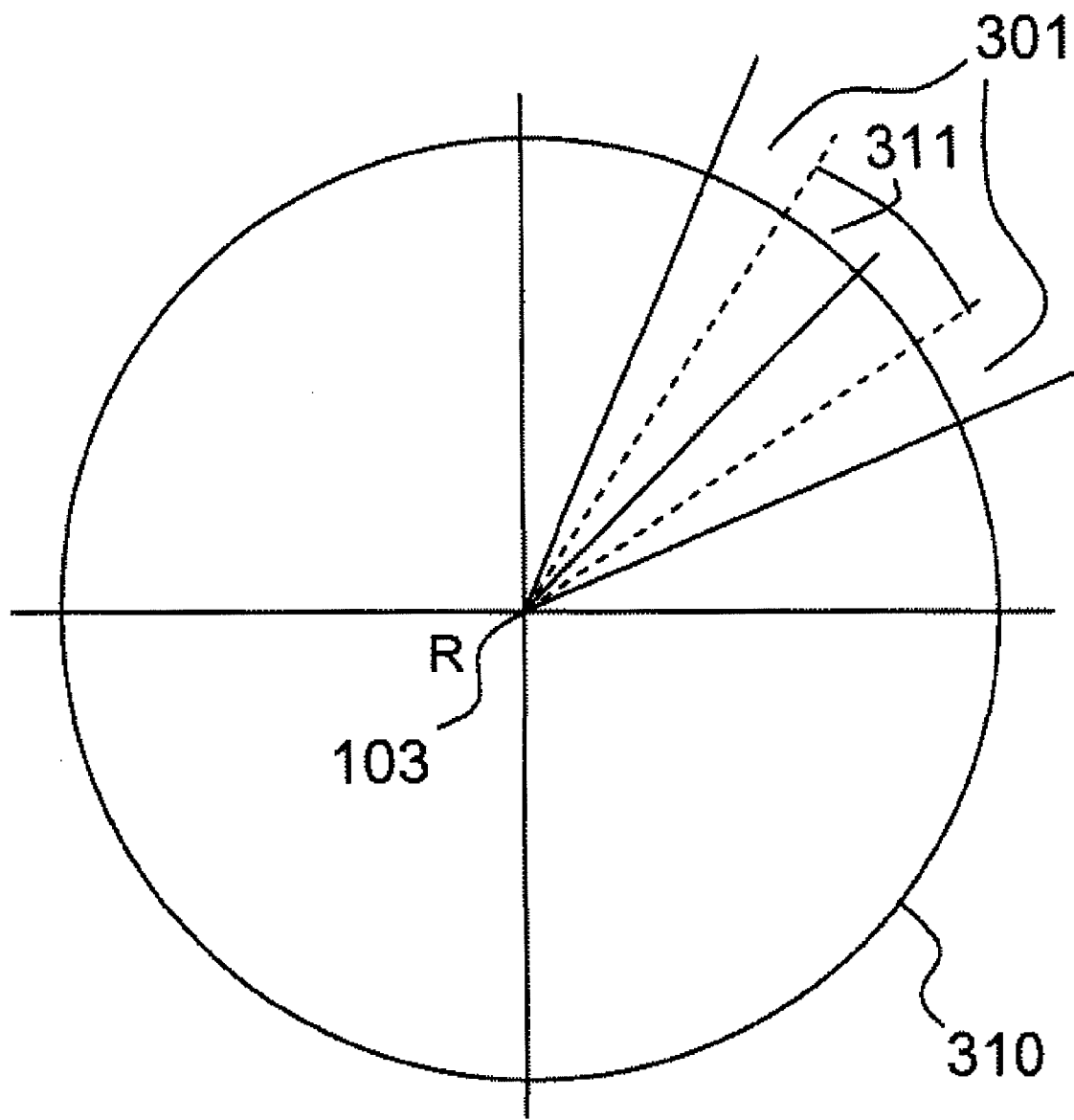
FIG. 3b, a diagram representing the subdivision by angular segments used in the processing of the information supplied by radars in the context of an air traffic control system known from the state of the art.

FIG. 3b is a diagram representing the subdivision by angular segments used in the processing of the information supplied by the radars in the context of an air traffic control system known from the state of the art. A detection coverage 310 of the radar 103, for example, is divided into plot segments 301 and into track segments 311.

The detection coverage 310 of the radar 103 is divided into segments of equal angular value. For example, for the rest of the description, it will be considered that the radar has 32 plot segments of 11.25°, counted in the anticlockwise direction, from 0 to 31. Thus, the angular value of the radar segment of number S lies within the range [S*11.25°; (S+1)*11.25°]. Each time that the antenna of the radar 103 passes from one plot segment to another, an end-of-segment message is produced. A "north pulse" message corresponds to the passage of the antenna of the radar 103 over the north local to the radar 103. There are certain radars that do not produce end-of-plot-segment messages, but all the radars produce a "north pulse" type message and/or a "segment 0" type message.

From the point of view of the radio tracking system, the detection coverage of each radar that it incorporates is divided into plot segments 301 and track segments 311 of equal angular value. Each radar comprises 16 plot segments and 16 track segments of 22.5°, counted in the anticlockwise direction from 0 to 15. The plot segments 301 and the track segments 311 are angularly offset from one another by an angular value corresponding to a half-segment. Thus, the track segment N 311 is overlapped by the plot segments 301 N−1 and N. The plot segment N 301 of the radar 103 comprises all the radio-tracked plots obtained from the radar 103, whose azimuth lies within the range [N*22.5°; (N+1)*22.5]. The track segment N 311 comprises all the multiple-radar tracks belonging to the detection coverage 310 of the radar 103, and whose azimuth relative to this radar lies within the range [N*22.5°+11.25°; (N+1)*22.5+11.25°].

The plot segments 301 and track segments 311 are the basic tracking processing units for a radio tracking system. Hereinafter in this description, the terms "plot segments" and "track segments" designate plot segments and track segments internal to the multiple-radar tracking.

The overlapping of the plot segments and of the track segments makes it possible to affirm that:
  a plot of the segment N correlates with a track of the segment N and/or N+1;
  if a plot of the segment N correlates with a track of the segment N, this track can be correlated with a plot of the segment N−1. Thus, in order to ensure that all the plots correlating with this track are taken into consideration, it is necessary to consider the plots of the plot segments N and N−1, which in practice results in the need to make use of buffer storage of a plot segment;
  if a plot of the plot segment N correlates with a track of the track segment N+1, this track can also correlate with a plot of the plot segment N+1. Thus, in order to ensure that all the plots correlating with this track are taken into consideration, it is necessary to consider the plots of the plot segments N and N+1, and thus make use of the buffer storage of a plot segment.

The plots of the plot segments N−2 and N−1 are used to update or create tracks of the track segments N−2 and N−1. Furthermore, to confirm the association of a plot of the plot segment N with a track of the track segment N or N+1, it is necessary for all the tracks of all these segments and all the plots correlated with these tracks to be taken into consideration. This is the worst case, in which three buffer segments are needed. In most cases, the association processing can be performed by using 1 or 2 segments. It is in fact necessary to wait for a plot segment in order to check the availability of all the plots and all the tracks to be involved. This step makes it possible to avoid edge effects caused by detections at the boundary between two plot segments: it would, for example, be possible to associate a plot of the segment N with a track for which the detection is in fact in the plot segment N−1.

In order to simplify the processing operations, and in order to present the data in a summary form, a multiple-radar radio tracking system makes use of a hypothetical radar. The hypothetical radar is a radar that does not exist physically, but that is managed internally by the radio tracking system. It is described as a radar of infinite range, that is to say one that detects all the field of interest of the radio tracking system, centred on the system centre of the radio tracking system, and its period is slightly less than the period of the fastest radar integrated by the radio tracking system.

The radio tracking system therefore generates internally end-of-segment messages from the hypothetical radar. These synchronizations will make it possible, independently of the radar messages received, to sequence the general processing operations of the radio tracking system. Among other things it allows for the management of the radar states or for the activation of periodic processing operations for managing the multiple-radar tracks generated by the tracking of the system.

A multiple-radar track is created and maintained until its death by using plots supplied by the different radars.

A track can have a number of states:
  "Confirmed" state: this is a track that has been processed by the automatic track initialization function and that is deemed "safe". In other words, this track is considered to be representative of an aircraft actually present within the detection coverage and hitherto unknown to the system;
  "Initializing" state: this is a track currently being processed by the function and not yet confirmed.

If a current radar system is used in the context of a TIS-B service, the theoretical latency introduced by this system is given by the following formula:

$t_{latency} = ((S_s + R) \times N)/360) * T_{radar} + P$ seconds, in which:
Ss is the size of a segment in degrees,
R is the size of the overlap of plot/track segments in degrees,
$T_{radar}$ is the period of revolution of the radar in seconds,
N is the maximum number of buffer memory segments needed at the input of the radio tracking processing operation; this number is specific to each radar connected to the radio tracking system (1<N≤8),
P is the processing delay in seconds introduced by the CPU overload (typically 200 ms).

If we consider, for example, the case of a radar whose period of revolution is 12 seconds, with a number of buffer memory segments equal to 1 (this presupposes that all radar plots are received in the right segment, and that all the plots are received at the same time), the minimum latency introduced is 2.25 seconds, without counting the time associated with the execution of the processing operation.

If we consider, for example, the case of a radar whose period of revolution is 4 seconds, with a number of buffer memory segments equal to 1, the minimum latency introduced is 750 milliseconds, without counting the time associated with the execution of the processing operation.

Now, it should be recalled here that the maximum latency allotted to a radio tracking system in the context of a TIS-B service is 850 milliseconds.

The sequencing of the multiple-radar radio tracking processing operation can be defined as follows:
  reception of the plot segment N from the radar R,
  Processing of the Confirmed Tracks:
  correlation of the confirmed tracks of the track segment N from the radar R with the plots of the segments N and N−1,
  association of a plot with a track, for the correlated plots,
  processing of the captures and management of the manoeuvres,
  updating of the tracks associated with a plot,
  management of the confirmed tracks.
  Processing of the Tracks Just Confirmed:
  correlation of the tracks confirmed at the time of their preceding update, of the track segment N−1 from the radar R with the plots of the segments N−1 and N−2,
  association of a plot with a track, for the correlated plots,
  processing of the captures and management of the manoeuvres,
  updating of the tracks associated with a plot,
  management of the confirmed tracks.
  Processing of the Tracks being Initialized:
  correlation of the tracks being initialized of the track segment N−1 from the radar R with the plots of the segments N−1 and N−2,
  association of a plot with each track, for the correlated plots,
  estimation of the tracks associated with a plot,
  management of the tracks being initialized,
  creation of the tracks with the remaining plots of the segment N−2.

Sequencing of the tracks from the radar R belonging to the segment N+8, which is explained by the fact that, at most, the buffer storage involves 8 segments according to the processing operations known from the state of the art. This means that it is possible to wait for the time equivalent of 8 segments, and therefore that certain tracks may be updated with up to the time equivalent of 8 segments after the reception of the plot. The sequencing is therefore performed only when it can be certain that the update has indeed been performed for this track.

The acquisition of a new plot segment N triggers the processing of the confirmed tracks sequenced in the track segment N from the radar concerned. During the correlation-association phase, the confirmed tracks of the segment N are compared in the radar's reference base to the plots of the new plot segment N, and to the remaining plots of the plot segment N−1 (that is to say, the plots not having been used for updating a track previously).

At the output of the correlation-association phase, plot-track pairings have been formed; the capture prevention algorithm then checks that these associations are valid and, if necessary, track hypotheses are split in order to manage the possibilities of movement of the targets (single component or main component/manoeuvring component).

Then, each track associated with a plot is updated with the information concerning this plot. The management of the tracks makes it possible to complement the update of all the information concerning the tracks: management of the manoeuvres, identification, management of the IFF-type codes, associated variance, and the discarding of certain tracks.

At the end of the processing operations, the plot segment N contains no more than the plots that have not been used for a track update. These plots can correspond to the detection of targets represented by confirmed tracks of the track segment N+1; they will be used again on reception of the plot segment N+1

On the other hand, the remaining plots in the segment N−1 can no longer be assigned to confirmed tracks since they have already been compared to all the confirmed tracks likely to be associated with them.

On completion of the processing of the confirmed tracks of segment N, that of the tracks having been confirmed upon their preceding update is carried out; the processing operations implemented are the same as those for the confirmed tracks.

This phase is made necessary to manage the problems at the boundaries upon the transition from a track being initialized to a confirmed track, and prevent these new confirmed tracks, because of the order of arrival of the plot segments, from being updated with detection that concerns them.

There are then performed the processing operations on the tracks currently being initialized of the track segment N−1 from the radar concerned, with the remaining plots of the plot segments N−1 and N−2: correlation-association, updating of the tracks associated with a plot, and management of the tracks being initialized (promotion: that is to say, the transition from the initialization state to the confirmed state, management of the IFF codes, discard).

In the plot segment N−1 there remain only the plots that have not been used for a track update. These plots can correspond to targets represented by tracks being initialized of the track segment N and will be used upon reception of the plot segment N+1.

The remaining plots of the segment N−2 have not been used to update any track, confirmed or currently being initialized, but can correspond to tracks still unknown to radio tracking: a track creation attempt is assigned to them.

Finally, the tracks of the track segment N+8 from the radar are resequenced. The processing operations triggered by the reception of the plot segment N are terminated. The tracking is then ready to process a new plot segment.

The correlation algorithms, which are themselves known to those skilled in the art, work on the basis of proximity criteria between plots and tracks, according to a subdivision of the space of interest specific to each radar, by cells dividing angular segments dividing up the coverage of the radar. Thus, the cells situated in proximity to the radar centre, have smaller dimensions than the more distant cells. This disparity leads to well known problems of missed detections, or even of impossibility to correlate plots with tracks, for targets moving in vertical proximity to the radar centre.

Figure 4:
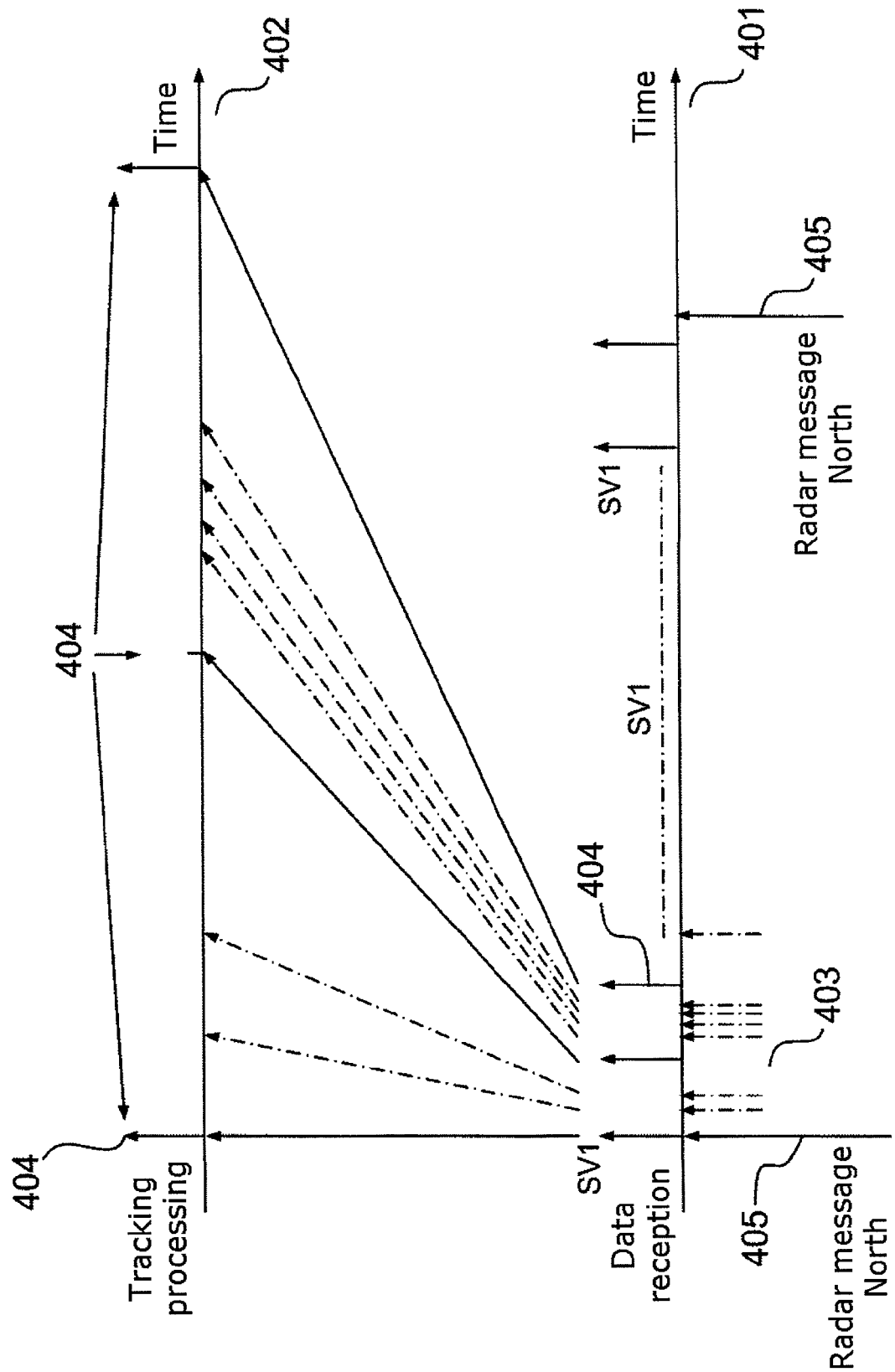
FIG. 4, an example of time diagram representing an example of sequencing of the processing of the incoming data in the context of a multiple-sensor radar tracking system according to the invention.

FIG. 4 presents a time diagram representing an example of sequencing of the processing of the incoming data in the context of a multiple-sensor radar tracking system according to the invention. A first time diagram 401 represents the received data originating from a radar, between two north pulses 405. A set of plots 403 are detected during this interval. The interval is subdivided into internal virtual segments, or SVI 404. A second time diagram represents the sequencing of the tracking processing operation according to the invention.

In the radio tracking system proposed by the present invention, unlike the radio tracking systems known from the state of the art, an incoming radar plot 403 is no longer placed in buffer memory, but sent directly to the internal radio tracking functions, which makes it possible to save on at least one buffer memory segment.

As soon as a plot 403 is received by the multiple-radar tracking processing operation, it is stored in a buffer memory until an internal virtual segment 404 is received. The SVIs 404 are generated internally via the use of a time counter. The transmission period of such an event is for example 187.5 milliseconds, which corresponds to a radar whose period of revolution is 3 seconds, and comprising 16 SVI.

The reception of an SVI 404 triggers the multiple-radar tracking processing operation, with the use of plots stored previously. According to the present invention, the plots and the tracks are no longer sequenced and processed according to plot segments or track segments, but according to their membership to a cell of a system grid. This system grid is described hereinbelow with reference to FIGS. 5a and 5b.

On reception of an SVI 404 by the processing system, the correlation-association processing operations are started upon the basis of the plots 403 stored since the preceding SVI 404.

According to the latency delay of the plot and according to the time of the SVI, the plot is retained in the buffer memory in order to wait for other competing plots for the correlation phase and that can then be associated with the track.

Figure 5A:
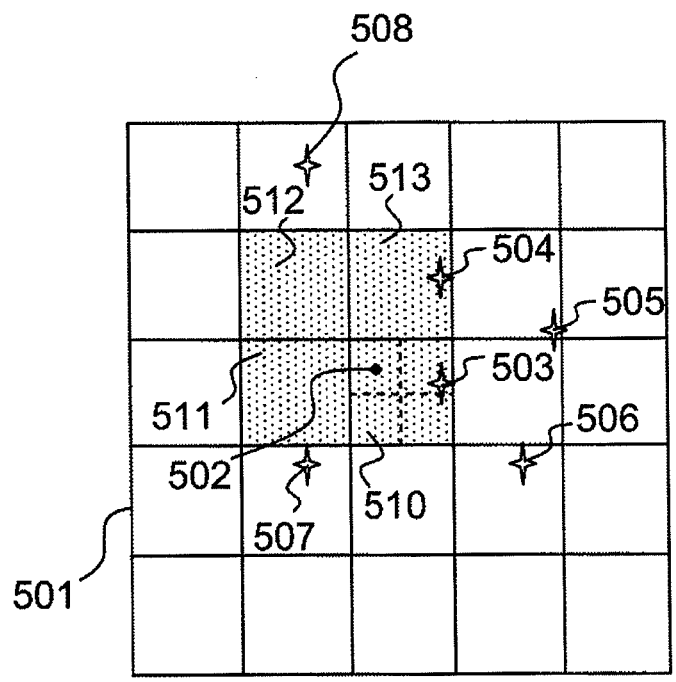
FIGS. 5a and 5b, representative diagrams of an example of a correlation method implemented in a multiple-sensor radar tracking system according to the invention.
Figure 5B:
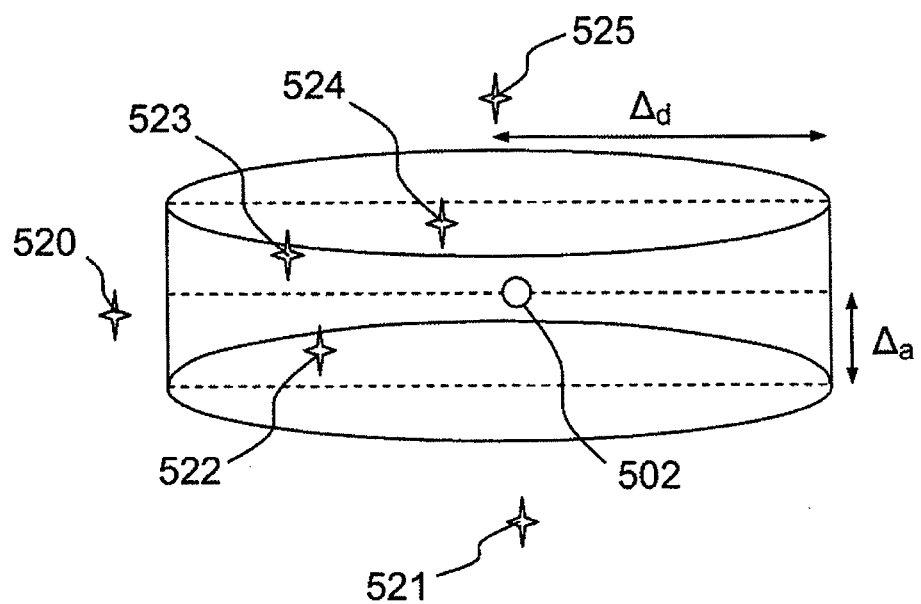

FIGS. 5a and 5b present diagrams representative of the correlation method implemented in a multiple-sensor radio tracking system according to the invention. In FIG. 5a, various examples of outlines of the space of interest, are represented in projection, for example on a stereographic plane, by a grid 501 subdivided into a plurality of rectangular cells. Advantageously, the cells are square in shape, for example with a side of 10 Nm. A radar plot 502 is represented in a cell 510. The cell 510 notably comprises adjacent cells 511, 512 and 513. Tracks 503 and 504 belong respectively to the cell 510 and to one of the adjacent cells 504. Tracks 505 to 508 belong to other cells more or less close to the cell 510.

The cells adjacent to a square cell are, for example, defined as cells that have a peak or a side in common with that cell.

The sequencing of the multiple-radar radio tracking processing operation according to the invention can be defined as follows:

Correlation-Association Processing:
On reception of an SVI 404, the correlation and association processing operations are activated. According to a first correlation criterion, the tracks sequenced in the cells of the grid 501 that are closest to that 510 in which the radar plot 502 is located are declared candidates for the correlation with this plot: for example, the tracks situated in the cells adjacent to the cell 510 in which the radar plot 502 is located are declared candidates for the correlation: in other words, the tracks 503, 504, 505, 506 and 507 in the example of the figure. Advantageously, the cell 510 can be subdivided into 4 subcells, and only the subcells of the cell 510 and the cells adjacent to the subcell containing the radar plot 502 are declared candidates. The cells adjacent to a subdivision are the cells of the two-dimensional grid that have a side or a peak in common with the square defined by the subdivision of the cell. In the example of the figure, the cells 510, 511, 512 and 513 are declared candidates. Thus, the tracks contained in these cells, or the tracks 503 and 504, are potentially correlated with the radar plot 502.

FIG. 5b illustrates a second criterion that can be applied in the correlation phase. In the figure, a radar plot 502 is represented in a three-dimensional space in perspective. Six tracks 520 to 525 have been retained according to the abovementioned first correlation criterion.

A second, more discriminating correlation criterion, based on a position difference taking into account the altitude of the tracks, helps to reduce the number of tracks selected for the correlation according to the first criterion. For example, it is possible to discriminate for the correlation the tracks whose altitude differs from the altitude of the radar plot 502 by an altitude greater than a determined value $\Delta_d$, and/or are distant in the stereographic plane by a distance greater than a determined value $\Delta_a$. In the example of the figure, only the tracks 522, 523 and 524 are retained.

The plots retained for the correlation are all the plots previously stored in the buffer memory, whereas the tracks retained are the union of all the tracks retained for each plot. The correlation processing operation, apart from the process of selection of the plots and tracks, remains identical to the process known from the state of the art cited above with reference to FIGS. 3a and 3b.

After the correlation phase, the association phase is executed. It is based on principles similar to the association processing operation known from the state of the art and described above with reference to FIGS. 3a and 3b, apart from the addition of an additional criterion based on the time difference between the time of reception of the radar plot and the time of reception of the SVI message that has triggered the correlation-association process operations:

if the time difference is less than a determined threshold, for example set at 400 ms, then the association of the plot with the track is not confirmed, and the plot remains in the buffer memory. The track is then not updated;

if the time difference is greater than the threshold, then the association is confirmed. The plot is then associated with the track; an update is performed and the plot is removed from the buffer memory.

After the association processing operation, a plot can therefore be:

associated with a track: an update is then performed (it is removed from the buffer memory), not associated with a track because of a time difference that is too small: the plot then remains in the buffer memory, not correlated with any of the existing tracks in the track base: the plot is then sent to the initialization processing operation and originates the creation of a new track.

The present invention makes it possible to resolve the technical problem posed by allowing for a significant reduction in the latency time introduced by the multiple-radar radio tracking system, so as to render it compatible with the requisite demands for a TIS-B service.

The theoretical latency time for a radio tracking system according to the invention is given by the following formula:

$t_{latency} = ((SVI_d \times N) + D + P)$ seconds, in which:

$SVI_d$ is the SVI message sending period in seconds (for example: 0.1875 s),

N is the number of SVI pending (for example set at 1 by default),

D is the delay in seconds, of authorized plot latency (for example set at 0.400 s by default), P is the delay in seconds, for processing introduced by the CPU overload (typically: 0.2 s).

The latency of a multiple-radar radio tracking system based on the method according to the present invention is not dependent on the characteristics of the radars connected to the system, and has a fixed duration; it should be noted that this method can equally be applied to the information supplied by all the other types of sensors involved in air traffic control.

By using the default values cited above by way of example, the latency is established at 787.5 ms, regardless of the radar concerned. This latency is less than the latency allotted to a radio tracking system used in the context of a TIS-B-type application.

The method of reducing the latency time according to the invention allows for performance levels never hitherto reached by any multiple-radar radio tracking system, and also makes it possible:

- to overcome the "time disorder" problems introduced by the networks transporting the radar data,
- not to be dependent on a radar sectorization, or the sending by the radar of end-of-segment messages,
- to apply an on-the-fly processing that ensures that a maximum of plots are taken into account independently of the problems inherent to the network transporting the radar data and the radar head problems,
- for targets situated in proximity to the radar centre, to resolve a large proportion of the problems for trajectories with marked movement.

What is claimed is:

1. A method of processing tracks of air targets moving in a space of interest, the method comprising:

detecting at a plurality of sensors, the detecting originating from the plurality of sensors being synthesized as detections of a single dummy radar;

establishing a two-dimensional grid of a stereographic projection plane of the space of interest, the two-dimensional grid being divided into a plurality of cells of rectangular shape, wherein a cycle period of the single dummy radar is subdivided in a plurality of internal virtual time segments of determined duration;

storing, in a buffer memory of a radio tracking system, all detections produced during at least one internal virtual time segment; and correlating, via a correlation function, the detections with the tracks of the air targets on a basis of a first proximity criterion between the cells of the two-dimensional grid containing the detections and the cells of the two-dimensional grid containing the tracks of the air targets, said correlation function being triggered by a message indicating an end of at least one internal virtual time segment, the correlation being made on a basis of the detections stored in the buffer memory during the at least one internal virtual time segment.

2. The method of processing tracks of air targets according to claim 1, further comprising:

associating, via an association function, the detections with the tracks of air targets on a basis of an additional criterion of time difference between an instant of reception of a radar detection and an instant of reception of the message indicating the end of the at least one internal virtual time segment having triggered the correlation and association processing operations, wherein the additional criterion confirms the association of the detection with the tracks of the air targets, an update of the tracks of the air targets and a deletion of the detection from the buffer memory, if said time difference is greater than a determined threshold, the additional criterion retains the detection in the buffer memory for a subsequent processing operation if the time difference is less than the determined threshold.

3. The method of processing tracks of air targets according to claim 1, wherein the plurality of cells of rectangular shape have a square shape with a side having a predetermined length.

4. The method of processing tracks of air targets according to claim 1, wherein the first proximity criterion elects candidate tracks for the correlation with a given point corresponding to a detection, all the tracks situated in 8 cells adjacent to the cell containing the given point, and in said cell.

5. The method of processing tracks of air targets according to claim 4, wherein the first proximity criterion elects candidate tracks for the correlation with a given point corresponding to a detection, all the tracks situated in 3 cells adjacent to one of identical subdivisions of the cell containing the given point, and in said cell.

6. An air traffic control system for processing tracks of air targets moving in a space of interest, the air traffic control system comprising:

a plurality of sensors configured to detect said tracks, the detections originating from the plurality of sensors being synthesized in the form of detections of a single dummy radar, the air traffic control system being configured to:

establish a two-dimensional grid of a stereographic projection plane of the space of interest, the two-dimensional grid being divided into a plurality of cells of rectangular shape, wherein a cycle period of the single dummy radar is subdivided in a plurality of internal virtual time segments of determined duration, the air traffic control system further comprising:

a buffer memory of a radio tracking system configured to store all detections produced during at least one internal virtual time segment; and a kernel of a computation unit, the kernel configured to implement a correlation function, said correlation function configured to correlate the detections with the tracks of the air targets on a basis of a first proximity criterion between the cells of the two-dimensional grid containing the detections and the cells of the two-dimensional grid containing the tracks of the air targets, said correlation function being triggered by a message indicating an end of at least one internal virtual time segment, the correlation being made on a basis of the detections stored in the buffer memory during the at least one internal virtual time segment.

* * * * *